(12) United States Patent
Tsai

(10) Patent No.: US 6,992,542 B2
(45) Date of Patent: Jan. 31, 2006

(54) METHOD FOR FAST DESIGN OF MULTI-OBJECTIVE FREQUENCY-SHAPING EQUALIZERS

(75) Inventor: Kuen-Yu Tsai, Stanford, CA (US)

(73) Assignee: Stanford University, Palo Alto, CA (US)

( * ) Notice: Subject to any disclaimer, the term of this patent is extended or adjusted under 35 U.S.C. 154(b) by 38 days.

(21) Appl. No.: 10/709,441

(22) Filed: May 5, 2004

(65) Prior Publication Data

US 2004/0223543 A1      Nov. 11, 2004

Related U.S. Application Data

(60) Provisional application No. 60/468,354, filed on May 6, 2003.

(51) Int. Cl.
*H04B 3/04* (2006.01)
(52) U.S. Cl. .................................. 333/28 R; 375/232
(58) Field of Classification Search .............. 333/28 R, 333/28 T, 18; 375/232, 233
See application file for complete search history.

(56) References Cited

U.S. PATENT DOCUMENTS 5,714,918 A * 2/1998 Menkhoff ................. 333/28 R

* cited by examiner

*Primary Examiner*—Stephen E. Jones

(57) ABSTRACT

A method for fast design of an equalizer to compensate for some undesired frequency response of an existing system. It can incorporate frequency response data directly. It allows for the performance tradeoff between a plurality of input-output channels. One embodiment of the invention comprises: defining a system block diagram including a equalizer, an existing system, and one or more weighting filters for the performance tradeoff between a plurality of input-output channels; defining a set of performance tradeoff equalities, each on one of a selected set of discrete frequencies; providing the frequency response data for the equalities; solving independently the magnitude of the equalizer frequency response of each of the discrete frequencies; generating the phases of the equalizer such that the magnitudes and the phases correspond to the frequency response of a stable system; implementing the equalizer with parameters derived from the magnitudes and the phases. Each of the performance tradeoff equalities is defined such that the frequency response of the equalizer to be solved is first constrained to be real or nonnegative, at each of the selected frequencies. In another embodiment, the performance tradeoff equalities are substituted with a set of performance tradeoff optimization problems. Each of the performance tradeoff optimization problems is defined such that the frequency response of the equalizer to be optimized is first constrained to be real or nonnegative, at each of the selected frequencies.

12 Claims, 9 Drawing Sheets

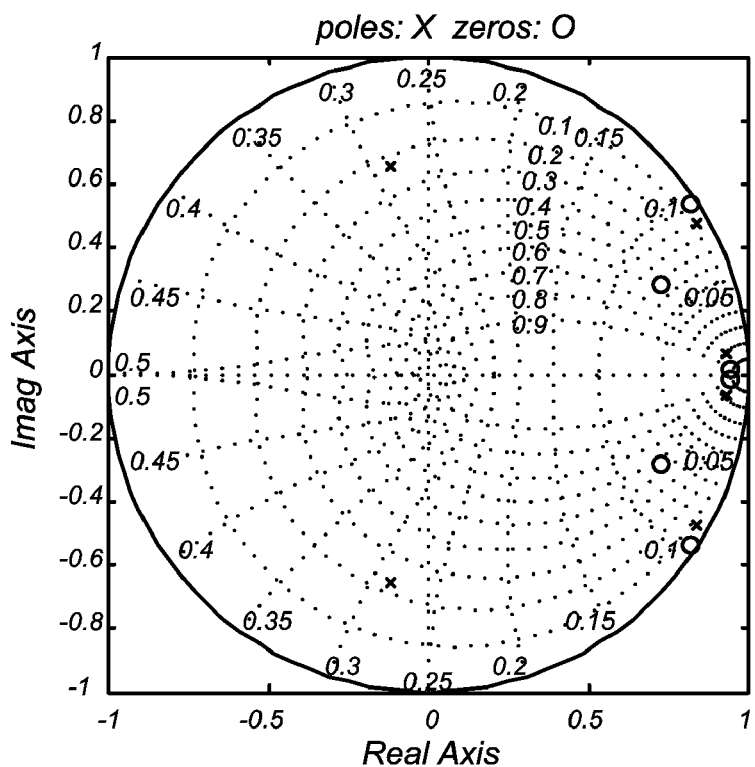
Figure 8A
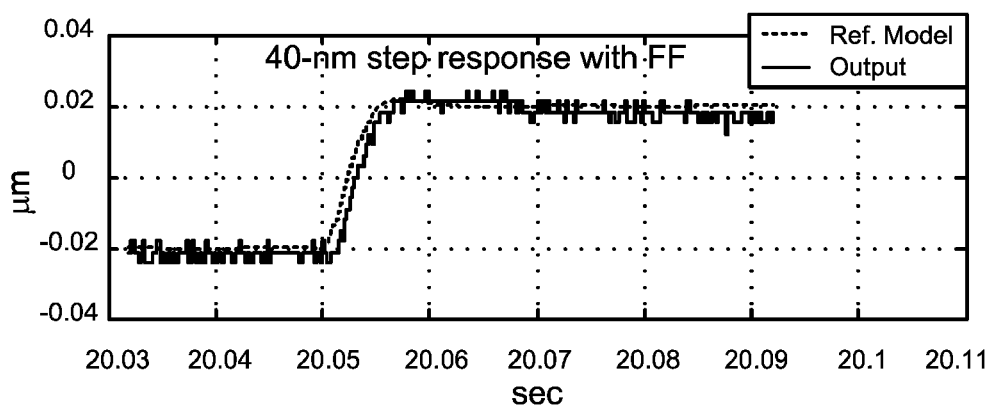
Figure 8B
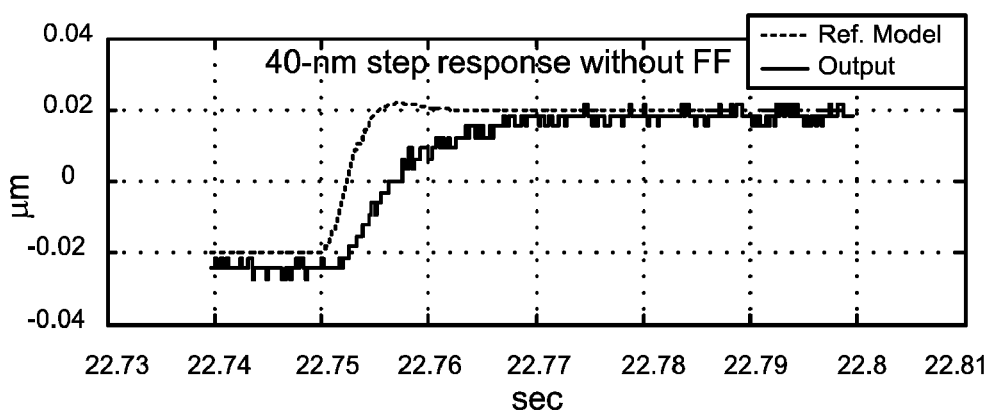

METHOD FOR FAST DESIGN OF MULTI-OBJECTIVE FREQUENCY-SHAPING EQUALIZERS

CROSS REFERENCE TO RELATED APPLICATIONS

This application claims the benefit of PPA No. 60/468,354, filed on May 6, 2003, by the present inventors.

FEDERAL RESEARCH STATEMENT

The original research work was done in Stanford University, and was supported by National Science Foundation, with ECS-0000541. Stanford University shall hold the patent rights.

BACKGROUND OF INVENTION

1. The Field of the Invention

This invention relates to the fields of communication, control, and signal processing engineering, specifically to the design of equalizers to compensate for the undesired frequency response of a system. Some of the related fields include 330/304, 333/28, 340/825.71, 375/229, and 700/44.

2. Background Information

In the fields of communication and signal processing engineering, equalizers are widely used to adjust the amplitude and the frequency spectrum of input signals, to compensate for the limited bandwidth or the undesired dynamics of a physical system such as a communication channel. For example, in many audio playback systems, pre-equalizers are used to modify the relative amplitudes at different frequency bands of the audio source signal (e.g., from a play out of a audio compact-disk player), to compensate for the non-ideal frequency response of the audio amplifier and the audio speaker, such that the human listener can hear less distorted sound versus the originally recorded sound in the audio compact-disk. In many audio recording systems, post-equalizers are used to compensate for the undesired frequency response of the microphone, before the audio signal is physically recorded on the recording media. FIG. 1A and FIG. 2A show examples for designing a post-equalizer and a pre-equalizer, respectively.

In the field of control engineering, pre-equalizers are interchangeably referred as pre-filters, feed-forward filters, command-shaping filters, input-shaping filters, and feed-forward controllers. For example, pre-equalizers are used in the positioning control of the read/write heads of data storage systems, such as a hard-disk drive or an optical-disk drive used in a modern personal computer. The position seeking commands are filtered by a pre-equalized before being sent to drive the voice-coil actuator. The pre-equalizer suppresses the spectrum contents of the seeking command that are located close to the resonant frequencies of the voice-coil actuator and the mechanical structure supporting the read/write head, in order to reduce the oscillatory response of the resulting positioning trajectory, and the induced vibration due to the resonant modes.

As another example: In the semiconductor manufacturing equipment industry, equipment engineers are responsible for improving the performances of many subsystems from various vendors, while integrating them into a larger manufacturing machine. Usually these subsystems already have feedback controllers provided by their vendors. For example, in a photo-lithography exposure machine, it is typical to find a temperature control system, wafer stage control system, and a vibration control system, etc. The said equipment engineers may find these controllers only provide moderate system performances. In this case, instead of replacing the feedback controllers immediately, the feed-forward controller is preferred during the initial redesign process, because it can be used in parallel with the existing feedback controllers. The said equipment engineers can measure the dynamic response of the original subsystems, and then design a feed-forward controller to improve its performances.

Ideally, an equalizer could be designed to simply inverse all the undesired dynamics of the physical system, such that the dynamics of the compensated system is satisfactory. In practice, many factors constrain the feasibility of this method. For example, the undesired dynamics may contain an unstable zero, whose inversion results in an unstable pole in the equalizer which causes the system response to diverge. The undesired dynamics may have more poles than zeros, such that its inverse is non-causal, which is not desirable if future input is not known in advance. In addition, pole-zero cancellation only works well when an accurate parametric model of the system is available. Furthermore, even if a perfect inversion equalizer can be implemented, the physical limit on actuator efforts and the presence of noise can severely degrade the performance of the compensated system.

In general, there are at least four factors to consider when designing an equalizer: 1. the tradeoff between different performance objectives; 2. the awareness of the input signals entering the equalizer in advanced; 3. the availability of an accurate parametric model of the physical system to be equalized; 4. the computational efficiency of the design algorithms.

The tradeoff between different performance objectives is common in many engineering design problems. In the case of designing pre-equalizers, the tradeoff between the performance of the equalized response and the magnitude of actuating signals entering the physical systems is fundamental as in most control systems. For example in FIG. 1B, the channel H can represent the combined dynamics of an audio amplifier and an audio speaker in the afford-mentioned audio system. There is a physical saturation limit on the amplitude of the signal u coming into the amplifier. Therefore when designing the pre-equalizer Q, both $z_1$, which is the difference between the desired output d and the equalized channel output, and $z_2$, which is the equalizer output signal u, need to be minimized. A performance tradeoff between the two objectives is necessary. In the case of post-equalizers, the tradeoff between the performance of the equalized response and the amplification of noise is fundamental as in most communication systems. For example in FIG. 1A, H can represent the dynamics of an audio recording channel from the sound being recorded to the microphone output. Because the electrical signal coming from a microphone is typically weak, some noise $w_2$ will be added due to the requirement of high-gain amplification. The level and the spectrum of the noise need to be considered. Otherwise, the post-equalizer Q can significantly amplify the noise such that the audio signal $w_1$ is indistinguishable. Therefore, it is desirable that a design algorithm provides some tradeoff capability between multiple performance objectives.

If the input signals to a system are know in advance, instead of designing a pre-equalizer, a set of optimal shaped commands can be directly computed by the method in [Tuttle, et al, U.S. Pat. No. 6,694,196, Feb. 17, 2004], and [S. Boyd, et al, "Control applications of nonlinear convex programming," Journal of Process Control, 8(5–6):313–324, 1998]. Similarly, in the application of post-compensating a non-perfect communication channel, if all the signals coming out of the communication channel are already known, the original signal can optimally estimated directly without designing a post-equalizer first, using basic least-square estimation techniques shown in [T. Kailath et al, Linear Estimation, 2000].

However, there are many cases when there is not much known about the input signal in advance, or when it is impractical to employ all the possible input command into the design of the feed-forward filter or the shaped input command. In these cases, the designer can not formulate exact constraint equations which specify the limit of the equalized system output, because the equalized system output depends on both the system dynamics and the input command. For example, in the afford-mentioned audio pre-equalizer application, because the audio signals stored on different audio compact disks are different from each other, it should not be considered as known in advance when designing the audio pre-equalizer in practice. In addition, for an audio compact disk storing 74 minutes of two-channel audio digitally sampled at 44.1 kilo-hertz, there are about 196 million samples of data per channel. Solving an optimization problem at such dimension is almost infeasible in practice. Another example is designing the feed-forward controller for the photo-lithography mask writer used in semiconductor manufacturing. For a 30 mm-by-20 mm exposure field with a 10 nanometer grid, there are about 12-tera pixels need to be written to a photo mask. Although the locations of these pixels are known in advance, the problem dimension is so large that it is impractical to apply convex optimization techniques.

In short, when the input signal can not be known in advance, the afford-mentioned approaches to directly optimize the shaped commands or signal estimation can not work. Therefore, an equalizer should be used. Furthermore, performance constraints should be specified in the frequency-domain in such case. These call for a need for designing frequency-shaping equalizers.

Many of the prior arts concerning equalizer design require a parametric model (e.g., a transfer function in the pole-zero form) of the system under control. The parametric model usually comes from applying model fitting to the data obtained by performing an input-output test on the system. For systems with complicated dynamics, some mismatch between the resulting parametric model and the actual dynamic behavior of the system can be significant. For a design algorithm that uses such parametric models, the resulting system performance can be significantly different from what is predicted in the design phase. Therefore, it is desirable that an equalizer design algorithm can directly incorporate the input-output test data of the system to be equalized. One type of such input-output test data is the frequency response measurement at a set of selected frequencies. For a linear time invariant system, it can be measured accurately, no matter how complicated the system dynamics is. It is desired to directly incorporate the frequency response data in the equalizer design process.

Furthermore, the computational efficiency of an equalizer design method should be considered. For a low-cost embedded computer system, the processing power and the available memory are usually quite limited. In addition, if the equalizer needs to be redesigned periodically possibly due to the change of dynamics, it is desirable that the computation algorithm involved is as simple and efficient as possible.

Among some of the prior arts related to the equalizers designs, the zero phase error tracking control proposed in [M. Tomizuka, "Zero phase error tracking algorithm for digital control," ASME J. Dynamic Systems, Measurement, and Control, vol. 109, no. 1, pp. 65–68, 1987] is capable of handling non-minimum-phase zeros, and it can have some optimal preview action for input commands that can be known in advance. However, it requires a parametric system model, and it does not provide a means to tradeoff between equalized performance and control efforts. The input-shaping technique [N. Singer and W. Seering, "Pre-shaping command inputs to reduce sys-tem vibration," ASME J. of Dynamic Systems, Measurement, and Control, Vol. 112, March 1990, and Singer, et. al. U.S. Pat. No. 4,916,635, Apr. 10, 1990 and U.S. Pat. No. 5,638,267, Jun. 10, 1997] can be used to generate a FIR (finite impulse response) filter to cancel the unwanted vibration modes of a system, when the input command is known in advance. It does not require a parametric model of the system. However, there is no means for afford-mentioned performance tradeoff. Many standard methods for designing both IIR and FIR digital equalizer are presented in [A. Oppenheim and R. Schafer, Discrete-Time Signal Processing, 2nd ed. 1999]. None of them provide a means for afford-mentioned performance tradeoff between different input-output channels.

Adaptive signal processing techniques can be used to design post equalizers as shown in [B. Widrow et al, Adaptive Signal Processing, 1985], and to design pre-equalizers as shown in [B. Widrow and E. Walach, Adaptive Inverse Control, Prentice Hall, 1996]. Essentially no prior knowledge about the system dynamics is required, due to the use of adaptive algorithms. It tracks the dynamics variation of slow-varying systems. The adaptive algorithm itself is quite simple. However, it dose not provide performance tradeoff capabilities.

In [T. C. Tsao, "Optimal feed-forward digital tracking controller design," ASME J. Dynamic Systems, Measurement., and Control, vol. 116, no. 4, pp. 583–592, 1994], the pre-equalizer design problem is transformed to a model-matching control problem in the frequency domain, by re-drawing block-diagrams to formulate a generalized control design block diagram as shown in FIG. 1C. Examples of formulating a generalized control design block diagram can be found in many control engineering textbook, such as [S. Skogestad et al, Multivariable Feedback Control, 1996], [S. Boyd et al, Linear Controller Design: Limits of Performance. Prentice-Hall, 1991], and [K. Zhou, Essentials of Robust Control, 1998]. Performance tradeoff in the frequency domain is possible. However, it can not directly incorporate the frequency response measurement. In [Giusto and F. Paganini, "Robust synthesis of feed-forward compensators," IEEE Transactions on Automatic Control, 44(8), August 1999], a frequency-domain robust synthesis approach is proposed to deal with modeling errors in terms of structured model uncertainty in a robust synthesis framework. The curve-fitting errors to measured frequency data can be incorporated. However, it is well known in the robust control community that the computation algorithm, known as $\mu$-synthesis, is complicated, and its convergence can be quite slow.

Convex optimization techniques can be applied to optimally design multi-object frequency-shaping equalizers with frequency response data incorporated directly. Some of the related prior work includes [B. Rafaely et al, "$H_2/H_\infty$ active control of sound in a headrest: design and implementation," IEEE Trans. Control System Technology, vol. 7, no. 1, Jan. 1999][P. Titterton, "Practical method for constrained-optimization controller design: $H_2$ or $H_\infty$ optimization with multiple $H_2$ and/or $H_\infty$ constraints," IEEE Proceedings of ASILO 1996][P. Titterton, "Practical multi-constraint $H_\infty$ controller synthesis from time-domain data," International J. of Robust and Nonlinear Control, vol. 6, 413–430, 1996][S. P. Wu et al, "FIR filter design via spectral factorization and convex optimization," in Applied Computational Control, Signal and Communications, 1997][K. Tsai et al, "DQIT: $\mu$-synthesis without D-Scale Fitting," American Control Conference 2002, pp. 493–498][S. Boyd et al, Linear Controller Design: Limits of Performance. Prentice-Hall, 1991] and [S. Boyd et al, "A new CAD method and associated architectures for linear controllers," IEEE Transactions on Automatic Control, vol. 33, p. 268, 1988].

The method starts with transforming equalizer design problems to a generalized control design block diagram as shown in FIG. 1C, in general using a technique known as Q-parameterization or Youla-parameterization. Both of the pre-equalizer and the post-equalizer design problems in FIG. 1B and FIG. 1A can be easily transformed by simply redrawing block diagrams. FIG. 2 shows the general case that includes the design of pre-equalizers, post-equalizers, and feedback controllers in the same framework. When feedback control is needed, a stabilizer J stabilize the system, while the equalizer Q is used to adjust the system response without causing instability, as long as Q itself is stable. The system 210, which is the combination of P and J. is equivalent to the system N in FIG. 1C. Once the design problem has been transformed to the form in FIG. 1C, it can be shown that in the frequency domain, the exogenous output z is related to the exogenous input w as $z=(N_{zw}+N_{zy}QN_{uw})w$, where $N_{zw}$ is the sub-part of N transferring from w to z, N is the sub-part of N transferring from y to z, and $N_{uw}$ is the sub-part of N transferring from w to u. The important aspect is that at each frequency, the equalized, closed-loop transfer matrix from w to z is $(N_{zw}+N_{zy}QN_{uw})$, which is convex in terms of the frequency response of Q at the same frequency, the equalizer to be designed. Therefore, frequency-shaping specifications and the tradeoff between different input-output channels can be specified as convex objectives and convex constraints when formulating a multi-objective optimization problem. In addition, the frequency response data of $N_{zw}$, $N_{zy}$, and $N_{uw}$ can be incorporated without curve-fitting them first.

Although there is no single prior-art publication explaining all the details of each step involved, FIG. 3 shows a typical flowchart of this approach, which assembles each of the steps distributed in the afford-mentioned prior-art publications. First in step 310, the block diagram in the form of FIG. 1c is determined, and input-output channels for performance tradeoff are specified. In step 320, frequency-shaping performance specifications are specified on their corresponding input-output channels at a set of selected frequencies, and a multi-objective convex optimization problem is defined. In step 330, the frequency response data of $N_{zw}$, $N_{zy}$, and $N_{uw}$, at a set of selected frequencies, are incorporated into the equalized transfer matrix $N_{zw}+N_{zy}QN_{uw}$. In step 340, the convex optimization problem is solved to simultaneously optimize all the magnitude and the phases of the equalizer Q at the selected frequencies. In step 350, the equalizers coefficients are derived from the magnitudes and phases by either using curve-fitting, or by computing their inverse discrete Fourier transform.

The convex optimization method mentioned above will provide a solution of the equalizer Q that approaches the globally optimal equalizer as long as the degree of freedom of Q is large enough, and the number of selected frequencies is sufficient. For example, if Q has a finite impulse response (FIR) structure, the degree of freedom of Q is related to the number of FIR taps to be optimized. The sufficiency of the number of selected frequencies is to reduce the ripple of frequency response in-between adjacent selected frequencies.

Unfortunately, the dimension of the optimization problem grows significantly with the degree of freedom of Q, and the number of frequencies selected. In general, significant computational resources are required in step 340, even though many efficient convex optimization algorithms have been proposed. When the equalizer decision variables are specified as the coefficients of the FIR taps, they need to be related to the equalizers frequency response by discrete Fourier transform in order to formulate the performance constraint equations in the frequency domain. Similarly, when the equalizer decision variables are specified as the real part and the complex part of the sampled frequency response of the equalizer, they need to be related to each other by the Hilbert transformation relation such that they correspond to the frequency response of a causal and stable system. These transform relations make the decision variables couple to each other, and hence the problem dimension grows with the number of selected frequencies and the number of the equalizer decision variables. Some examples can be found in [K. Tsai et al, "DQIT: $\mu$-synthesis without D-Scale Fitting," American Control Conference 2002, pp. 493–498]. Solving such kind of large-dimension optimization problems usually requires a high-performance computer with sufficient memory. Therefore, it is not easy to implement the method in FIG. 3 in a low-cost embedded system, or for real-time equalizer adaptations as shown in [B. Widrow and E. Walach, Adaptive Inverse Control, Prentice Hall, 1996, chapter 8 to 10].

Concluding the discussions so far: For the cases when the input signal can not be known or can not be practically treated as known in advance, what is desired for a feed-forward filter design approach is to formulate the design problem in the frequency domain, and to allow the designer to compensate for the undesired system frequency response as much as possible, while limiting the actuator effort in the frequency domain to a reasonable amount. It gives the designer the ability to tradeoff between the actuator effort and the system performance without knowing the detail of the input command. In addition, it is desired that the approach does not require a parametric model (such as an infinite-impulse-response transfer function) of the system, instead just employ the frequency response data of the system directly, which can be measured accurately. Therefore, the actual system performance with the implemented equalizer can be less sensitive to the modeling or curve-fitting errors. This can be done by directly incorporating the accurately measured system frequency response in the design process without the loss of fidelity due to parametric model fitting. These requirements can be satisfied by applying afford-mentioned multi-objective convex optimization technique to optimize the equalized transfer matrix $(N_{zw}+N_{zy}QN_{uw})$ at a set of frequencies. This in general solves the multi-objective frequency-shaping design problems for pre-equalizers, post-equalizers, and even the equalizers in FIG. 2 for feedback control. Unfortunately, the dimension of the optimization problem grows significantly with the number of frequencies selected and the number of the equalizer decision variables to be optimized. Therefore, it is not easy to implement such method in a low-cost embedded computer system. The invention discloses methods to decouple the dependency between equalizer decision-variables, which makes it highly efficient to implement, comparing to the afford-mentioned convex optimization method.

SUMMARY OF INVENTION

A method for fast design of frequency-shaping multi-objective equalizers is disclosed. The main advantages of this method include: 1. It does not require the designer to specify all the possible input commands; 2. It does not require the designer to provide a parametric model of the system. It incorporates the frequency response of the system directly, which can be measured directly from the system, or computed from the parametric model of the system, if such parametric model is available; 3. It allows for the tradeoff between the system output performance and the magnitude of the equalizer output or the noise amplification in the frequency domain, by designing dynamic performances weights for each of the corresponding input-output channels; 4. It is computationally efficient, due to that it first solves the magnitudes of the equalizer frequency response independently at each of a set of selected frequencies, then solves the phases using efficient signal processing algorithms.

One embodiment for of the invention includes first constraining the frequency response of Q to be real or nonnegative, when optimizing the equalized transfer matrix $N+N_{zy}QN_{uw}$ at each of a selected set of frequencies. This is equivalent with only optimizing the magnitudes of the equalizer frequency response. Then, the phases of the equalizer are recovered by efficient signal processing algorithms such as complex cepstrum explained in [A. Oppenheim and R. Schafer, Discrete-Time Signal Processing, 2nd ed. 1999], such that the magnitudes and the phases correspond to the frequency response of a stable system.

In another embodiment, the frequency response of Q are first constrained to be real or nonnegative, and each selected frequency, an equality is defined to approximate the multiple requirements that a number of different entries of the equalized transfer matrix need to be close to zero. The magnitudes of the equalizer are first solved independently at each selected frequency, then the phases are recovered by efficient signal processing algorithms such as complex cepstrum, such that the magnitudes and the phases correspond to the frequency response of a stable system.

Although many details have been included n the description and the figures, the invention is defined by the scope of the claims. Only limitations found in those claims apply to the invention.

BRIEF DESCRIPTION OF DRAWINGS

FIG. 8A is plot of all the poles and zeros of the low-order curve-fitting sixth-order system in FIG. 7B, to confirm that all of them are within the unit-circle.

FIG. 8B compares the 40-nanometer step responses of the original existing feedback control system, the resulting equalized system, and the reference model in the design example of FIG. 6B.

DETAILED DESCRIPTION

An Overview of an Embodiment of the Invention

A method for fast design of frequency-shaping multi-objective equalizers is disclosed. One embodiment for of the invention includes first constraining the frequency response of Q to be real or nonnegative, when optimizing the equalized transfer matrix $N_{zw}+N_{zy}QN_{uw}$ at each of a selected set of frequencies. This is equivalent with only optimizing the magnitudes of the equalizer frequency response. Then, the phases of the equalizer are recovered by efficient signal processing algorithms such as complex cepstrum, such that the magnitudes and the phases correspond to the frequency response of a stable system. In another embodiment, the frequency response of Q are first constrained to be real or nonnegative, and each selected frequency, an equality is defined to approximate the multiple requirements that a number of different entries of the equalized transfer matrix need to be close to zero. The magnitudes of the equalizer are first solved independently at each selected frequency, and then the phases are recovered by efficient signal processing algorithms such as complex cepstrum explained in [A. Oppenheim and R. Schafer, Discrete-Time Signal Processing, 2nd ed. 1999], such that the magnitudes and the phases correspond to the frequency response of a stable system.

Figure 3:
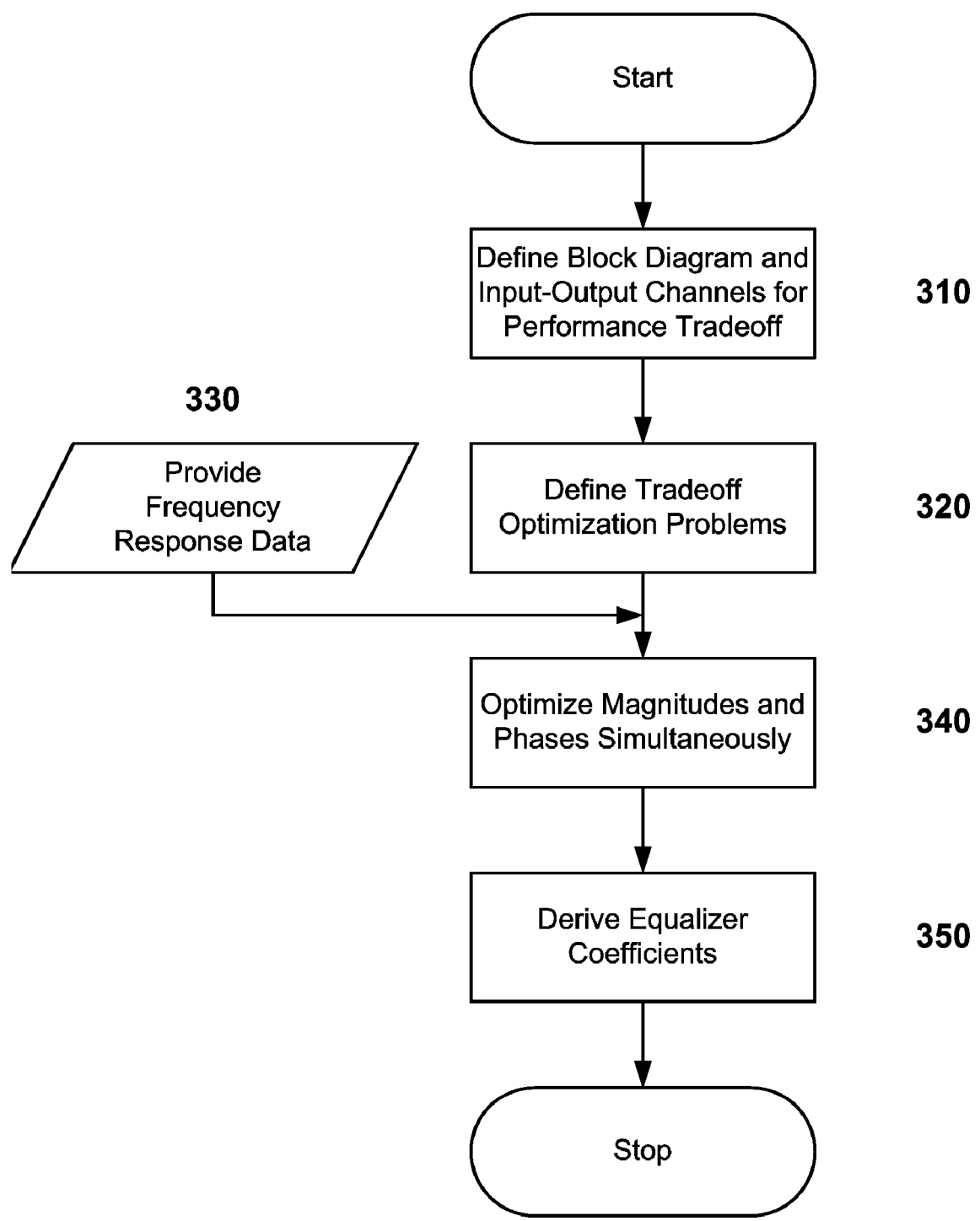
FIG. 3 is a prior-art flowchart for designing a multi-object frequency-shaping equalizer by applying convex optimization techniques to simultaneously optimize all the magnitudes and phases of the equalizer frequency response in one high-dimensional optimization problem.
Figure 4:
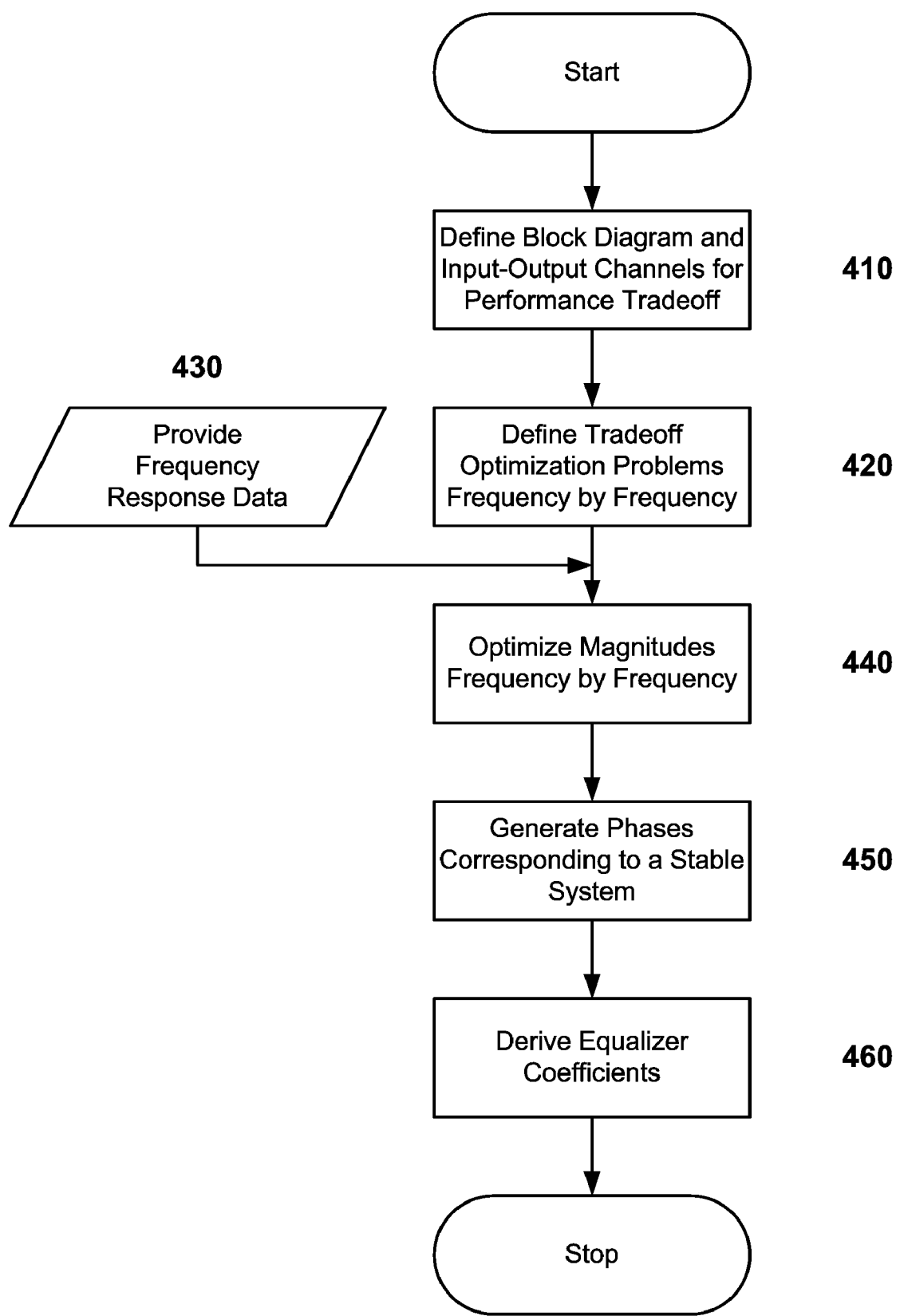
FIG. 4 is a flowchart as one example of one embodiment of the invention, for designing a multi-object frequency-shaping equalizer by first applying convex optimization techniques to independently optimize each magnitude of the equalizer frequency response at each frequency in a low-dimensional optimization problem, and then generate the phases using efficient signal processing techniques, such that all the magnitudes and the phases correspond to a stable system.
Figure 5:
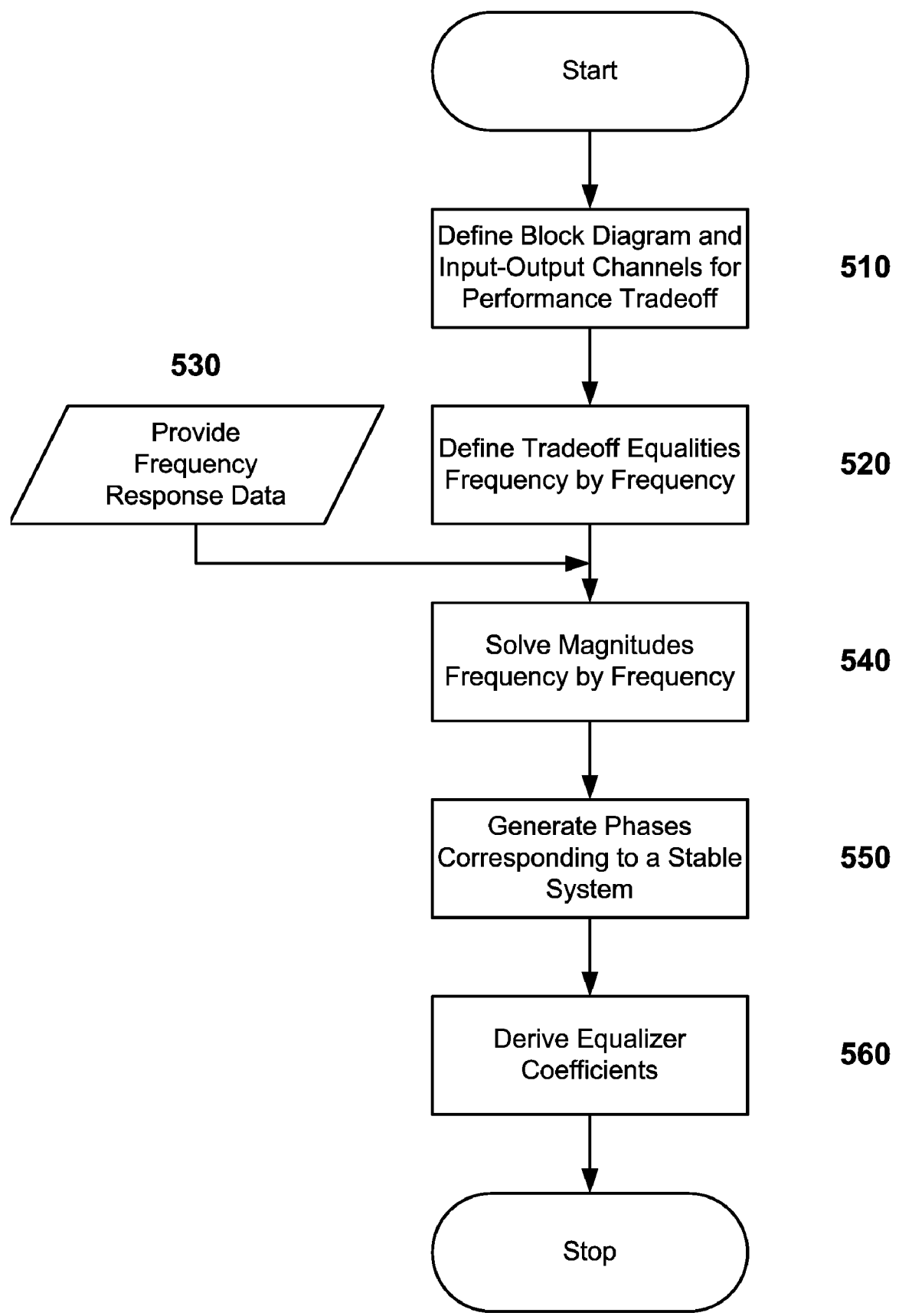
FIG. 5 is a flowchart as one example of another embodiment of the invention, for designing a multi-object frequency-shaping equalizer by independently solving each magnitude of the equalizer frequency response at each frequency in a low-complexity tradeoff equality, and then generate the phases using efficient signal processing techniques, such that all the magnitudes and the phases correspond to a stable system.

An example design flowchart in FIG. 4 is provided for the first embodiment. Another example design flowchart in FIG. 5 is provided for the second embodiment. Comparing with the prior-art design flow chart in FIG. 3, the design steps that appear in both the prior-art and the invention will only be briefly explained since their details can be found in several prior-art references.

A practical design example following the example design flowchart in FIG. 5 is described to demonstrate the effectiveness of the algorithms disclosed in the invention.

Defining Equalizer Design Multi-objective Optimization Problems Per Prior-Arts

Comparing the prior-art design flowchart in FIG. 3 and the two examples design flowcharts in FIG. 4 and FIG. 5, it is found that step 310 is identical to step 410 and step 510, step 330 is identical to step 430 and step 530. Both step 420 and step 520 are derived from step 320. Hence step 310, step 320, and step 330 are briefly described. Some prior-art publications include: [B. Rafaely et al, "$H_2/H_\infty$ active control of sound in a headrest: design and implementation," IEEE Trans. Control System Technology, vol. 7, no. 1, January 1999][P. Titterton, "Practical method for constrained-optimization controller design: $H_2$ or $H_\infty$ optimization with multiple $H_2$ and/or $H_\infty$ constraints," IEEE Proceedings of ASILO 1996][P. Titterton, "Practical multi-constraint $H_\infty$ controller synthesis from time-domain data," International J. of Robust and Nonlinear Control, vol. 6, 413–430, 1996][S. P. Wu et al, "FIR filter design via spectral factorization and convex optimization," in Applied Computational Control, Signal and Communications, 1997][K. Tsai et al, "DQIT: $\mu$-synthesis without D-Scale Fitting," American Control Conference 2002, pp. 493–498][S. Boyd et al, Linear Controller Design: Limits of Performance. Prentice-Hall, 1991] and [S. Boyd et al, "A new CAD method and associated architectures for linear controllers," IEEE Transactions on Automatic Control, vol. 33, p. 268, 1988].

Figure 1A:
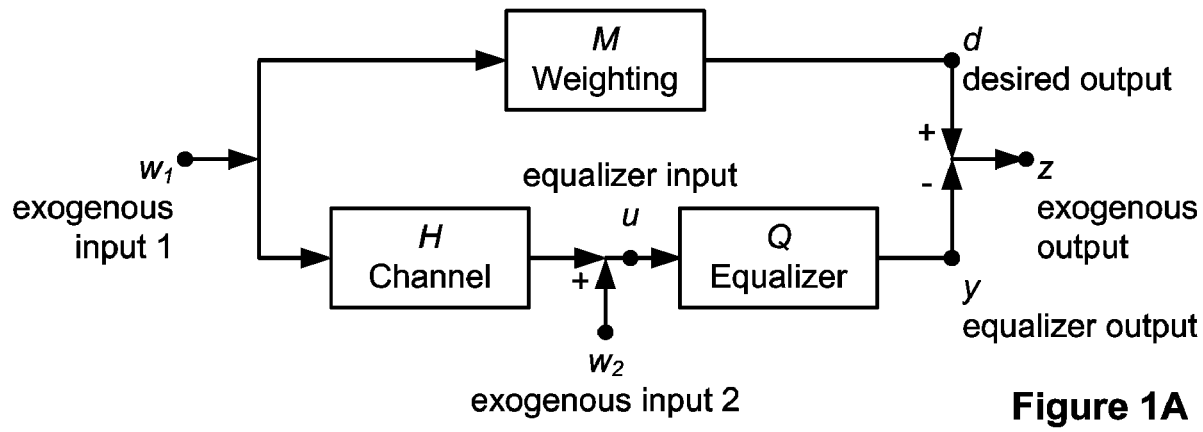
FIG. 1A is a prior-art block diagram for designing post-equalizers.
Figure 1B:
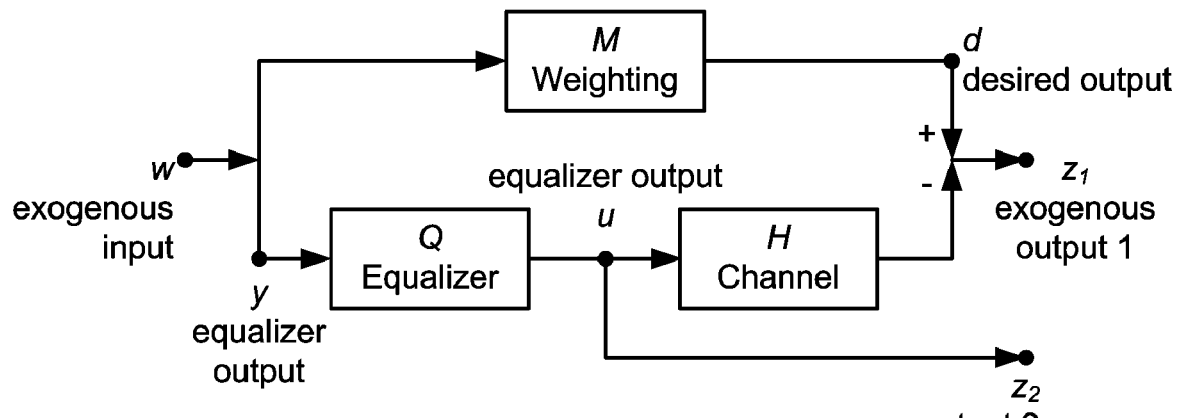
FIG. 1B is a prior-art block diagram for designing pre-equalizers.

In step 310, an original design block diagrams is defined to specify the interconnections between a existing channel or system H to be equalized, a equalizer Q to be designed, and one or a plurality of selected weighting filters. FIG. 1A shows as an example for designing a multi-objective post-equalizer, where both the gain from the exogenous input 1 $w_1$ to the exogenous output z, and the gain from the exogenous input 2 $w_2$ to the exogenous output z are desired to be as close to zero as possible. FIG. 1B shows as an example for designing a multi-objective pre-equalizer, where both the gain from the exogenous input w to the exogenous output 1 $z_1$, and the gain from the exogenous input w to the exogenous output 2 $z_2$ are desired to be as close to zero as possible. By rearranging block diagrams, all design block diagrams for pre-equalizers and post-equalizers can be transformed to a generalized equalizer design block diagram in FIG. 1C, where the exogenous input w, the exogenous output z, the equalizer output y, and the equalizer input u are in general all vector quantities. If an equalizer or an controller to be designed is involved in a feedback path, standard Q-parameterization or Youla parameterization techniques for example in [S. Boyd et al, "A new CAD method and associated architectures for linear controllers," IEEE Transactions on Automatic Control, vol. 33, p. 268, 1988] can be applied to transform the design block diagram to FIG. 2, where the stabilizer J maintains the stability of the overall system, while the stable equalizer is designed to optimize the closed-loop input-output dynamics. FIG. 2 can be easily transformed to FIG. 1C since system 210 is equivalent to the system N.

Figure 1C:
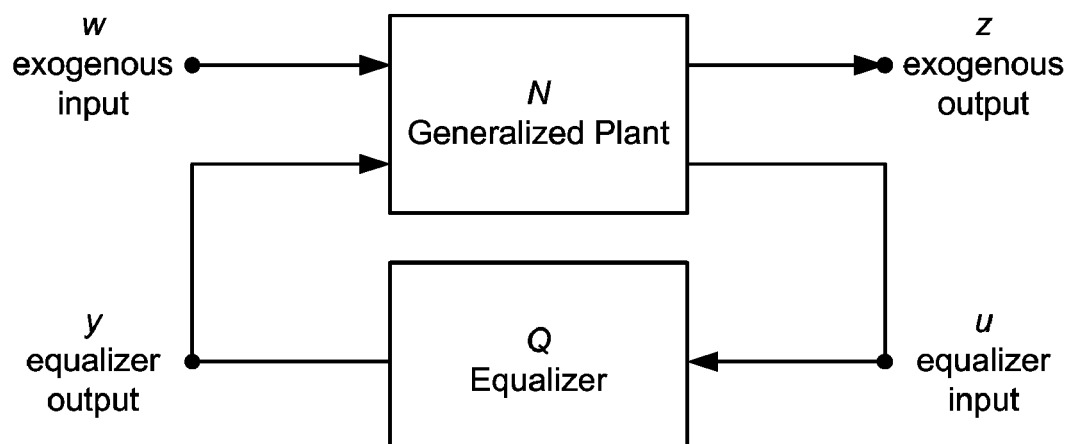
FIG. 1C is a prior-art block diagram for a generalized control design problem which can include both equalizer design problems and feedback control problems in the same framework.
Figure 2:
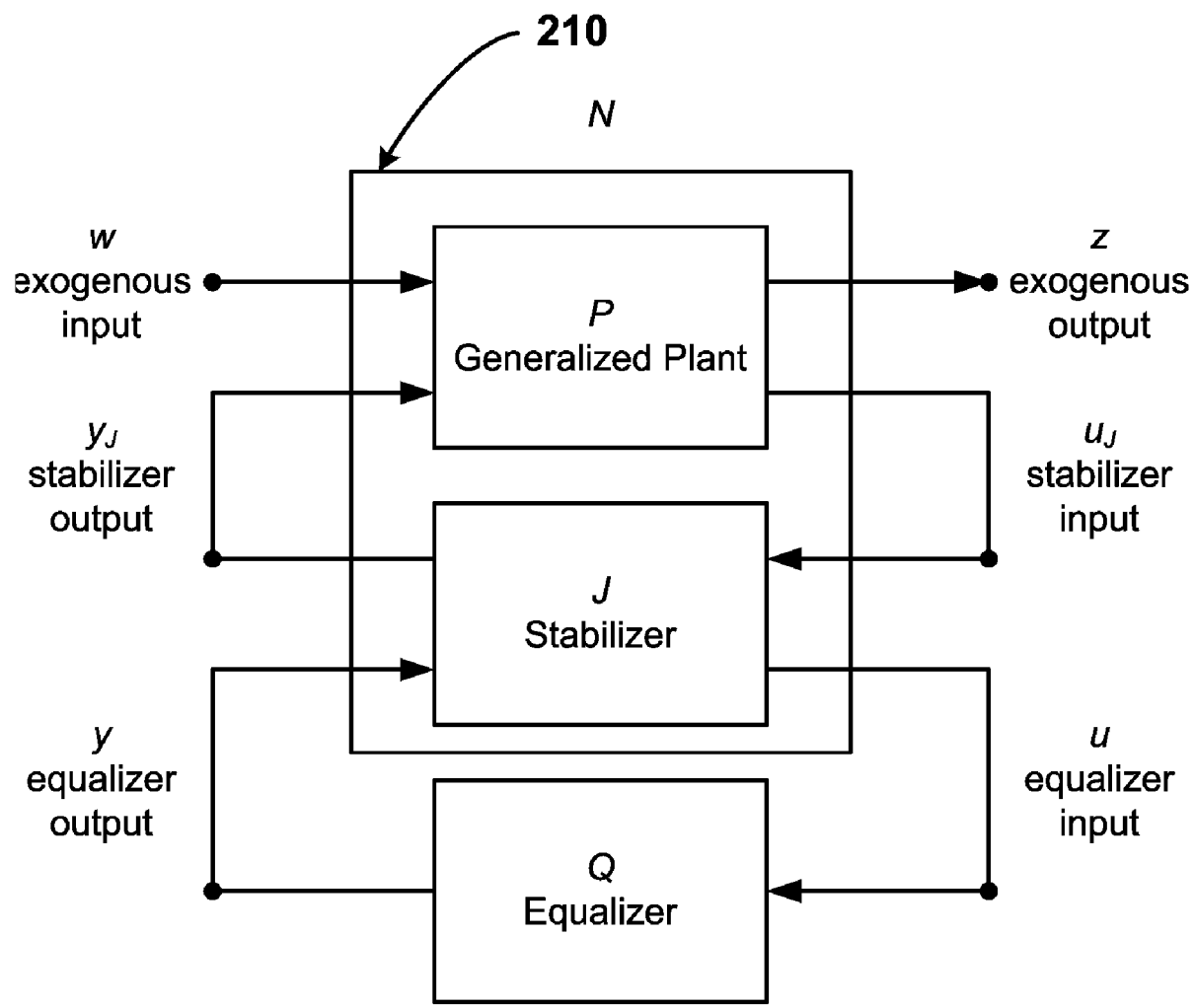
FIG. 2 is a prior-art block diagram showing a generalized control design problem when feedback stabilization is involved.

Once the design block diagram is in the form of FIG. 1C, the exogenous output z is related to the exogenous input w as $z=(N_{zw}+N_{zy}QN_{uw})w$, where N is the sub-part of N transferring from w to z, N is the sub-part of N transferring from y to z, and $N_{uw}$ is the sub-part of N transferring from w to u. At every frequency, the equalized, closed-loop transfer matrix from w to z is $(N_{zw}+N_{zy}QN_{uw})$, which is convex in terms of frequency response of Q at the same frequency. A convex optimization problem can be formulated and solved to find the globally optimal solution of Q.

Therefore in step 320, frequency-shaping specifications and the tradeoff between different input-output channels can be specified as convex objectives and convex constraints when formulating a multi-objective optimization problem. For the pre-equalizer design example in FIG. 1B, supposing every signal is a scalar quantity, $(N_{zw}+N_{zy}QN_{uw})$ is a two-by-one matrix. In fact, $(N_{zw}+N_{zy}QN_{uw})_{1,1}=M-HQ$, and $(N_{zw}+N_{zy}QN_{uw})_{2,1}=Q$. The notation $(A)_{i,j}$ is used to represent the entry of a matrix A from its j-th input to its i-th output. It is desired to make both performance objectives denoted by $f_1(Q)=|M-HQ|$ and $f_2(Q)=|Q|$ to be as closed to zero as possible. It is difficult to accomplish both objectives together unless M is zero as in a trivial case. Since both $f_1(Q)$ and $f_2(Q)$ are convex, a standard multi-objective convex optimize technique is to optimize $c_1 f_1(Q)+c_2 f_2(Q)$ where $c_1$ and $c_2$ are nonnegative and c1+c2=1. An explanation of this technique can be found in [S. Boyd et al, Linear Controller Design: Limits of Performance. Prentice-Hall, 1991]. A tradeoff curve between $f_1(Q)$ and $f_2(Q)$ can be generated by solving with many combinations of $c_1$ and $c_2$, and then some engineering judgments and decision can be made to select the best tradeoff point.

In step 330, the frequency response data of $N_{zw}$, $N_{zy}$, and $N_{uw}$ can be incorporated in the multi-objective optimization problems without curve-fitting them first.

Decoupling the Multi-object Optimization Problems

In one embodiment of the invention as shown in step 420 and step 440, the frequency response of the equalizer Q is first constrained to be real or nonnegative when optimizing the performance of different channels of $(N_{zw}+N_{zy}QN_{uw})$. For the previous pre-equalizer example $f_1(Q)=|(N_{zw}+N_{zy}QN_{uw})_{1,1}|=|M-HQ|$ and $f_2(Q)=|(N_{zw}+N_{zy}QN_{uw})_{2,1}|=|Q|$. Suppose only the magnitude of HQ is desired to match the magnitude of the reference weighing M at each of a set of selected frequencies, while ignoring there phase difference. Then $f_1(Q)$ is replaced by $f3(|Q|)=||M|-|H||Q||$, and f2(Q) is replaced by $f4(|Q|)=|Q|$. Then a set of multi-objective functions $c_1 f_3(|Q|)+c_2 f_4(|Q|)$ are defined at the selected frequencies, where $c_1$ and $c_2$ are nonnegative and c1+c2=1. After providing the frequency response data of $N_{zw}$, $N_{zy}$, and $N_{uw}$ in step 430, $|Q|$ is optimized at each of the selected frequencies independently in step 440. Alternatively, the phases of M and H can be preserved such that f1(Q) is replaced by $f5(|Q|)=M-H|Q|$. In general in each of the original objective functions defined in step 320 on each of the performance channels of $N_{zw}+N_{zy}QN_{uw}$, the argument Q is replace by $|Q|$ or constrained to be nonnegative. Each entry of $N_{zw}$, $N_{zy}$, and $N_{uw}$ may or may not be replaced by its absolute value or constrained to be nonnegative, depending on some engineering judgments and choices. After this decoupling, each the of the resulting optimization problems has problem dimension much smaller than the original optimization problem formulated in the prior-art step 320. Thus this method is easy to be implemented in low-cost embedded computer systems, or can be implemented for real-time adaptive filter designs.

Deriving Tradeoff Equalities from Multi-object Optimization Problems

In another embodiment of the invention as shown in step 520 and step 540, the frequency response of the equalizer Q is first constrained to be real or nonnegative, and a tradeoff performance equality at each selected frequency is defined for the performance of different channels of $(N_{zw}+N_{zy}QN_{uw})$. For the pre-equalizer design problem in FIG. 6B, supposing every signal is a scalar quantity, $(N_{zw}+N_{zy}QN_{uw})_{1,1}=1-W_T(G_{cl})_{1,1}Q$, and $(N_{zw}+N_{zy}QN_{uw})_{2,1}=1-W_U(G_{cl})_{2,1}Q$. Gcl, which is system 610, represents an existing feedback system. It is desired to optimize the equalized system output $z_h$ while minimize the actuating signal $z_k$ entering the physical channel H. In this case, the two objectives are defined as $f_1(Q)=|1-W_T(G_{cl})_{1,1}Q|$ and $f_2(Q)=|1-W_U(G_{cl})_{2,1}Q|$. Suppose at each of a set of selected frequencies, only the magnitude of $W_T(G_{cl})_{1,1}Q$ is desired to match the magnitude of its reference 1, and the magnitude of $1-W_U(G_{cl})_{2,1}Q$ is desired to match the magnitude of its reference 1, while ignoring there phase difference. An alternative view of $(N_{zw}+N_{zy}QN_{uw})_{1,1}=1-W_T(G_{cl})_{1,1}Q$ close to zero is $|W_T(G_{cl})_{1,1}Q|\leq 1$. An alternative view of $(N_{zw}+N_{zy}QN_{uw})_{2,1}=1-W_U(G_{cl})_{2,1}Q$ close to zero is $|W_U(G_{cl})_{2,1}Q|\leq 1$. The $\leq$ sign means close to, but no large than. All the possible combinations of $|W_T(G_{cl})_{1,1}Q|\leq 1$ and $|W_U(G_{cl})_{2,1}Q|\leq 1$ are within square 630, where the four corners are the desired solution points. However, the four desired solutions are not always possible unless $|W_T(G_{cl})_{1,1}|=|W_U(G_{cl})_{2,1}|$. In general, a solution close to the boundary of square 630 is acceptable because it implies at least one of the performance channels is close to specification. The boundary of square 630 can be approximate by any curves which are close to and are within the boundary. One of the possible choices is the unit circle within square 630. The resulting tradeoff performance equality is defined as $1=(|W_T(G_{cl})_{1,1}Q|^2+|W_U(G_{cl})_{2,1}Q|^2)^{1/2}$. After providing the frequency response data of $N_{zw}$, $N_{zy}$, and $N_{uw}$ in step 530, $|Q|$ is solved at each of the selected frequencies independently in step 540. In fact, any vector norm can be use to approximate square 630, and the resulting tradeoff performance equality is $1=(|W_T(G_{cl})_{1,1}Q|^p+|W_U(G_{cl})_{2,1}Q|^p)^{1/p}$.

In general, all the entries for the performance channels in $N_{zw}$ can be made to be no zero by augmenting a reference weighing for each performance channel, and then re-formulating $(N_{zw}+N_{zy}QN_{uw})$. Suppose there are N performance input-output channels, where N is a integer larger than 1, and for each performance channel with index i, the equalized response is $(n_1)_i+(n_2)_iq$, where $(n_1)_i$ is a scalar, $(n_2)_i$ is a wide-vector, and q is a tall-vector containing all the entries of Q at a selected frequency. The relation between Q and q can be found in [S. Boyd et al, "A new CAD method and associated architectures for linear controllers," IEEE Transactions on Automatic Control, vol. 33, p. 268, 1988]. It is desired that the magnitude of $(n_2)_iq$ matches the magnitude of $(n_1)_i$. This can be represented by $|(n_2)_iq|\leq|(n_1)_i|$. Therefore, in the general N-channel case Square 630 generalizes to an N-dimensional rectangular which defines the regions of acceptable solutions. An N-dimensional eclipse or a skewed N-dimensional norm ball can be defined to approximate the N-dimensional rectangular. Any set of $|q|$ which satisfies any of these approximate surfaces is a candidate for acceptable performance tradeoff.

After this derivation, each the of the resulting performance trade-off equalities has problem dimension much smaller than the original optimization problem formulated in the prior-art step 320. Thus this method is easy to be implemented in low-cost embedded computer systems, or can be implemented for real-time adaptive filter designs.

Recovering Phases Corresponding to a Stable System

In step 450 and step 550, the phases of the equalizer Q can be generated by applying efficient signal processing algorithms with the magnitudes computed from step 440 and step 540 respectively, such that the magnitudes and phases correspond to a stable system. One such algorithm is the complex cepstrum describe in [A. Oppenheim and R. Schafer, Discrete-Time Signal Processing, 2nd ed. 1999]. In this case, the magnitudes and phases correspond to a stable and minimum-phase system.

Deriving Equalizer Coefficients

In step 460 and step 560, several algorithms can be used to derive equalizer coefficients from the computed magnitudes and phases. For example, since the computed magnitudes and phases correspond to the frequency response of a stable system, by computing their inverse discrete Fourier transform, a stable impulse response is generated, which can be directly implanted as a finite-impulse-response filter. Model-reduction or curve-fitting techniques can be applied to the impulse-responses to find a lower-order filter for implementation. Similarly, model-reduction or curve-fitting techniques can be applied to the magnitudes and the phases directly to find a lower-order filter for implementation. Some prior-art publications include [J. Juang, Applied System Identification, Prentice Hall PTR, 1994][V. Oppenheim et al, Discrete-Time Signal Processing, Prentice Hall, 1989] for the optimal approximation of finite-impulse-response filters, and [Kollar, Frequency Domain System Identification Toolbox, The Mathworks, Inc., 1994][K. Liu et al "Frequency domain structural system identification by observability range space extraction," American Control Conference, vol. 1, June 1994, pp. 107–111][T. McKelvey et al, "Sub-space-based multivariable system identification from frequency response data," IEEE Transactions on Automatic Control, vol. 41, no. 7, July 1996][J. Juang, Applied System Identification, Prentice Hall PTR, 1994] for fitting frequency response data.

AN IMPLEMENTATION EXAMPLE

The design method following FIG. 5 has been tested in a real world application. FIG. 6A, FIG. 7A, FIG. 7B, FIG. 8A, FIG. 8B, FIG. 9A and FIG. 9B are copied from [K. Tsai, et al "Design of Feedforward Filters for Improving Tracking Performances of Existing Feedback Control Systems," American Control Conference 2002, pp. 4988–4993] which is claimed in the Provisional Patent Application No. 60/468, 354, filed on May 6, 2003 for this invention, by the present inventor. FIG. 6B and FIG. 6C are copied and modified from their original version.

Figure 6A:
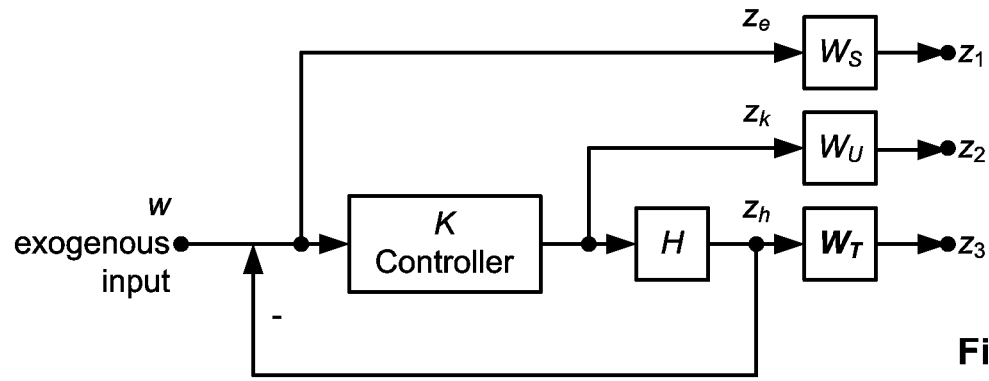
FIG. 6A is a prior-art block diagram showing a mixed-sensitivity feedback control design problem, which motivates the derivation of the method in FIG. 5.
Figure 6B:
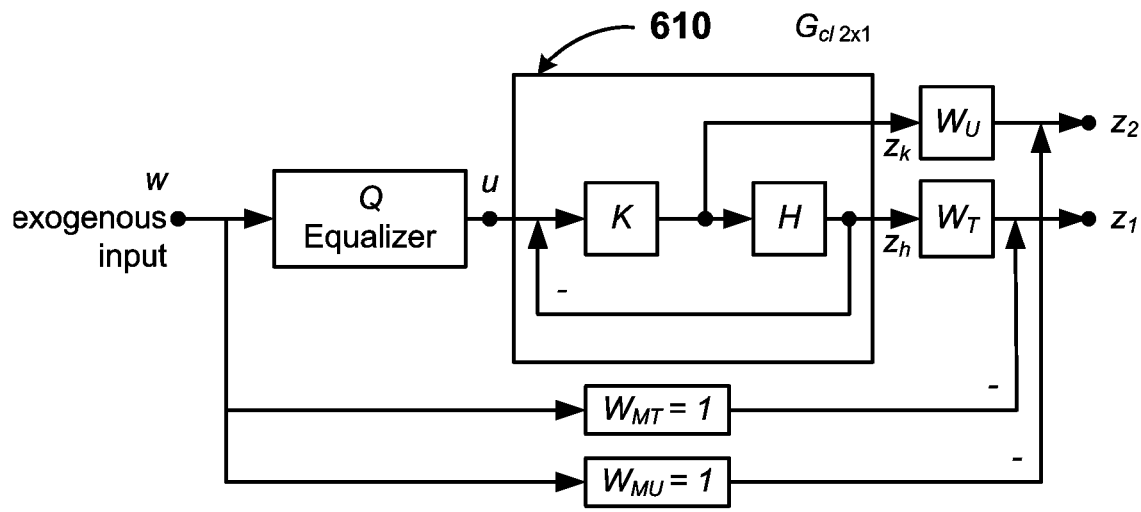
FIG. 6B is a block diagram showing an example for designing a multi-objective frequency-shaping pre-equalizer to improve the frequency response of an existing feedback-control system, using the design method illustrated in the flowchart of FIG. 5.
Figure 6C:
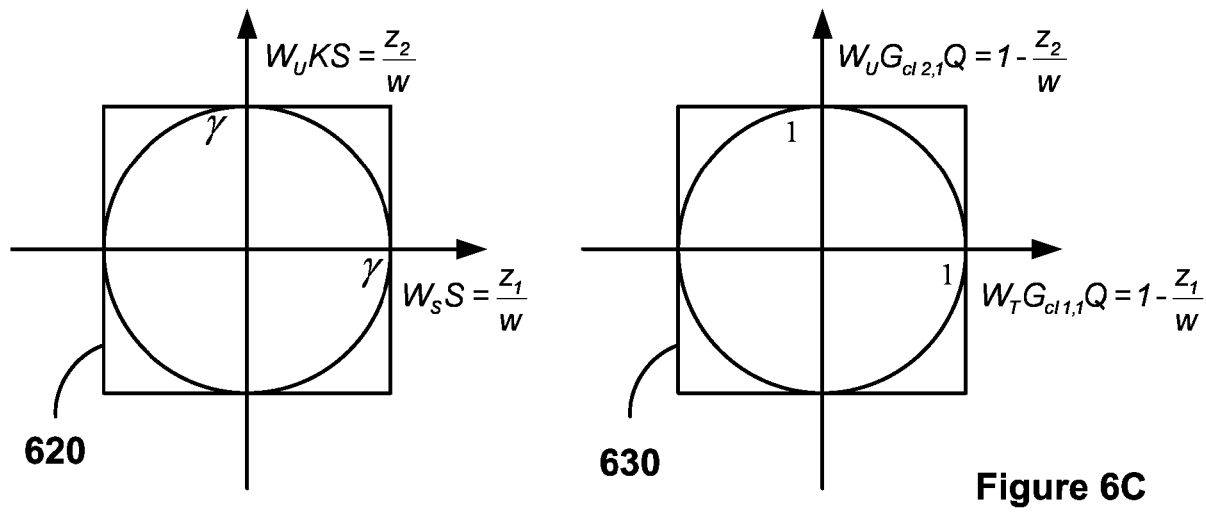
FIG. 6C illustrates the similarity between the mixed-sensitivity feedback control design in FIG. 6A and the multi-objective equalizer design in FIG. 6B.

FIG. 6A is a prior-art block diagram showing a mixed-sensitivity $H_\infty$ feedback control design problem, which motivates the derivation of the method in FIG. 5. For example, in the mixed S/KS problem, where S denotes the closed-loop sensitivity function from w to $z_e$, and KS denotes the closed-loop sensitivity function from w to $z_k$, we choose two objective functions: $f_1(K)=W_S S=z_1/w$, $f_2(K)=W_U KS=z_2/w$, it is desired to achieve both $|f_1(K)|\leq \gamma$, and $|f_2(K)|\leq \gamma$ for all frequencies, which can be simultaneously satisfied by $(|f_1(K)|^2+|f_1(K)|^2)^{1/2}\leq \gamma$. This motivates the derivation of the tradeoff performance equalities. FIG. 6B is a block diagram showing an example for designing a multi-objective frequency-shaping pre-equalizer to improve the frequency response of an existing feedback-control system, using the design method illustrated in the flowchart of FIG. 5. FIG. 6C illustrates the similarity between the mixed-sensitivity feedback control design in FIG. 6A and the multi-objective equalizer design of FIG. 5 in FIG. 6B.

Figure 7A:
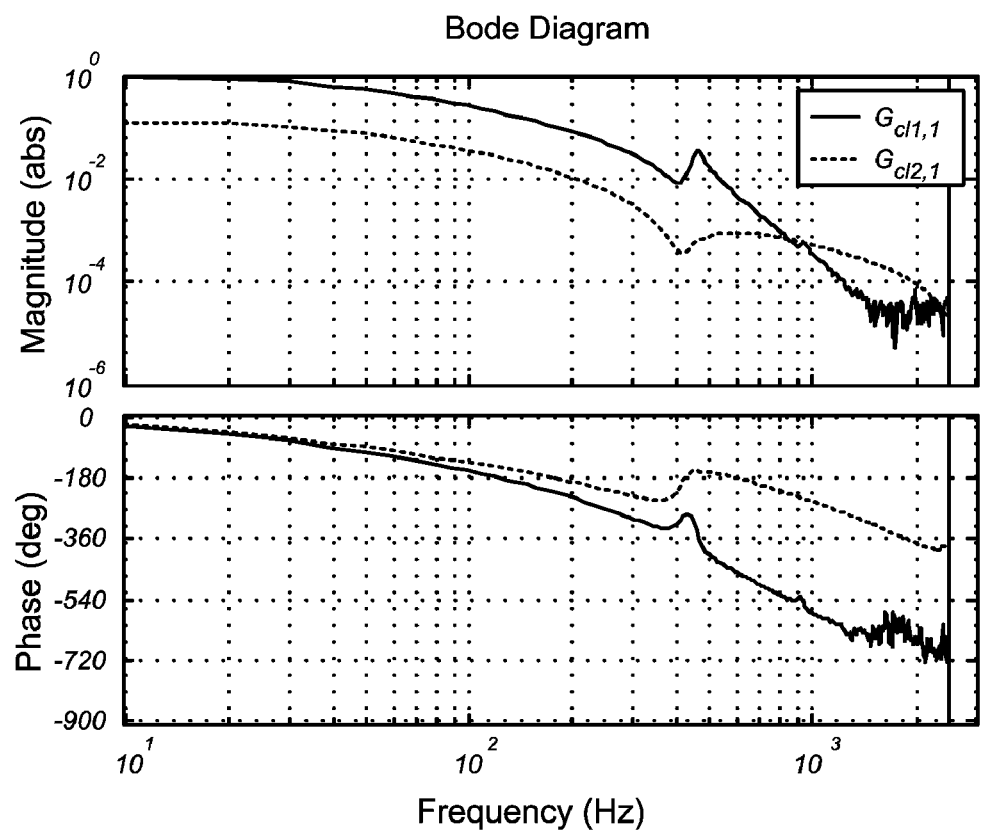
FIG. 7A is a plot of the frequency response data of the existing feedback-control system in FIG. 6B.
Figure 7B:
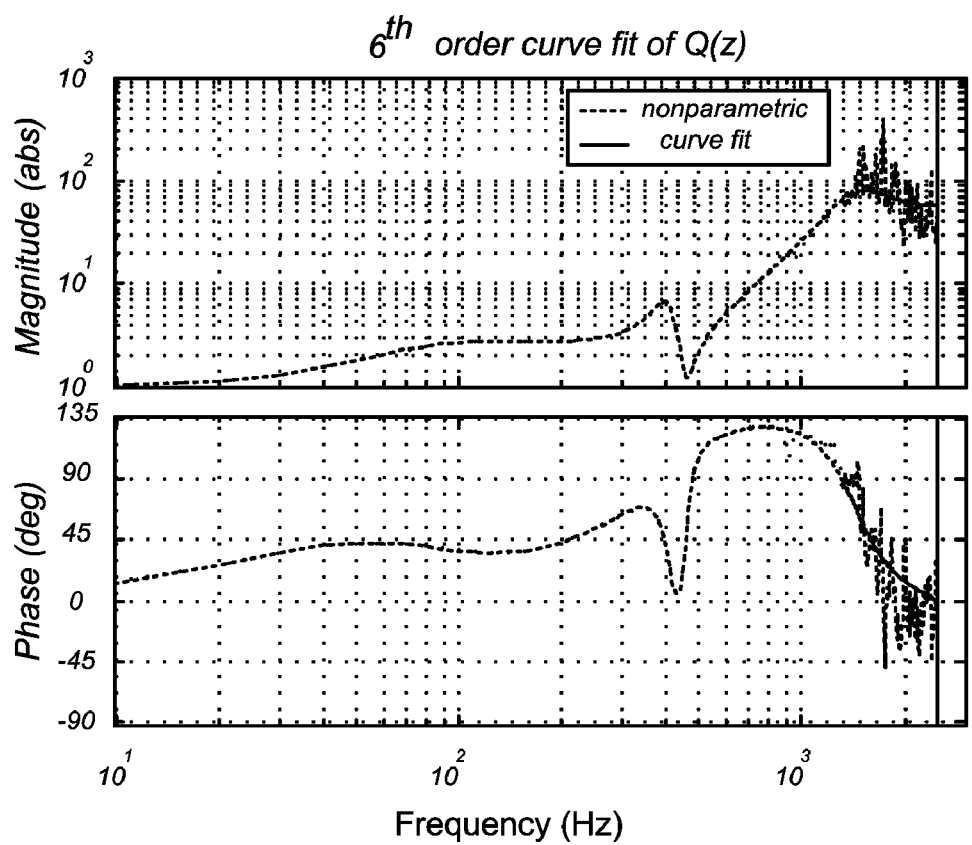
FIG. 7B is a plot of the designed magnitudes and phases of the pre-equalizer in FIG. 6B, and their low-order curve-fitting with a sixth-order stable and minimum-phase system.
Figure 9A:
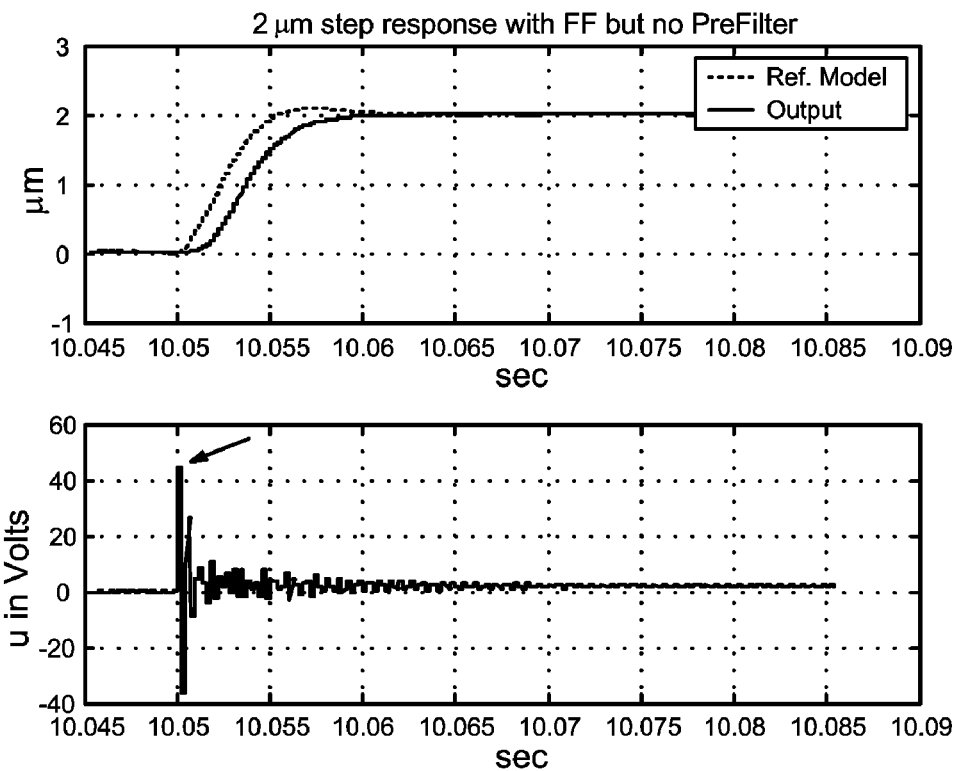
FIG. 9A shows the 2-micrometer step responses of the resulting equalized system and the reference model, and the magnitudes of the pre-equalizer output u in the design example of FIG. 6B.
Figure 9B:
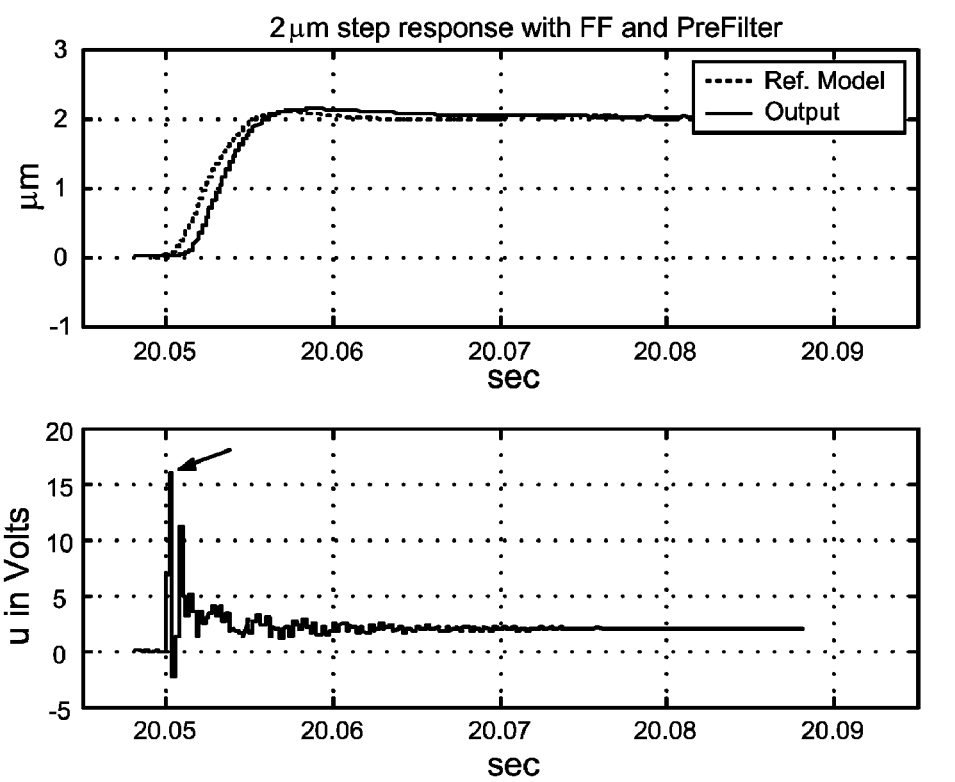
FIG. 9B shows the magnitudes of the pre-equalizer output u in the design example of FIG. 9B can be significantly reduced by designing a second pre-equalizer in front of the first pre-equalizer.

FIG. 7A is a plot of the frequency response data of the existing feedback-control system 610 in FIG. 6B. In this case, system 610 represents a nano-positioning system driven by piezoelectric actuators. Since the existing feedback controller K is implemented as analog circuits, both its input u and its output $z_k$ have physical limitation on their maximum amplitude. Therefore a control weighting filter $W_u$ is selected to allow for the performance tradeoff. FIG. 7B is a plot of the designed magnitudes and phases of the pre-equalizer Q in FIG. 6B using the method of FIG. 5, and their low-order curve-fitting with a sixth-order stable and minimum-phase system. FIG. 8A is plot of all the poles and zeros of the low-order curve-fitting sixth-order system in FIG. 7B, to confirm that all of them are within the unit-circle. FIG. 8B compares a 40-nanometer step responses of the original existing feedback control system, a 40-nanometer step responses of resulting equalized system, a the 40-nanometer step responses of the reference weighing $W_T$. FIG. 9A shows a 2-micrometer (2000-nanometer) step responses of the resulting equalized system, a 2-micrometer step responses the reference weighing $W_T$, and the magnitudes of the pre-equalizer output u. Because u is not taken into consideration originally, it is found that it peaks at 40 volts which is much higher than its physical limitation which is 10 volts. Therefore the equalized output does not match the output of the reference weighting as well as the previous case with a much smaller 40-nanometer input. FIG. 9B shows the magnitudes of the pre-equalizer output u in the design example of FIG. 9B can be significantly reduced by designing a second pre-equalizer in front of the first pre-equalizer, and thus the equalized output match better to the output of the reference weighting with a 2-micrometer (2000-nanometer) step input.

CONCLUSION

What has been described is a method for fast design of multi-objective frequency-shaping equalizers. One embodiment for of the invention includes first constraining the frequency response of Q to be real or nonnegative, when optimizing the equalized transfer matrix $N_{zw}+N_{zy}QN_{uw}$ at each of a selected set of frequencies. This is equivalent with only optimizing the magnitudes of the equalizer frequency response. Then, the phases of the equalizer are recovered by efficient signal processing algorithms such as complex cepstrum, such that the magnitudes and the phases correspond to the frequency response of a stable system. In another embodiment, the frequency response of Q are first constrained to be real or nonnegative, and each selected frequency, an equality is defined to approximate the multiple requirements that a number of different entries of the equalized transfer matrix need to be close to zero. The magnitudes of the equalizer are first solved independently at each selected frequency, then the phases are recovered by efficient signal processing algorithms such as complex cepstrum, such that the magnitudes and the phases correspond to the frequency response of a stable system.

What is claimed is:

1. A method for designing a frequency-shaping equalizer to compensate for the frequency response of an existing system, said method comprising:
   a. providing a performance block diagram defining one or a plurality of input-output channels for performance tradeoff, said performance block diagram comprising a plurality of blocks representing the dynamics of said equalizer to be designed, the dynamics of said existing system, and the dynamics of one or a plurality of selected performance weighting filters;
   b. defining a set of performance tradeoff equalities relating to the frequency response of said input-output channels at a set of selected frequencies, each of said tradeoff equalities being defined at each of said set of selected frequencies;
   c. computing the magnitudes of the frequency response of said equalizer at said set of selected frequencies, by solving each of said tradeoff equalities independently;
   d. generating the phases of said equalizer at said set of selected frequencies from said magnitudes, said phases and said magnitudes corresponding to the frequency response of a stable system at said set of selected frequencies;
   e. providing a set of equalizer coefficients for implementation, said equalizer coefficients being derived from said magnitudes and said phases of said frequency response of said equalizer at said set of selected frequencies.

2. The method of claim 1, wherein each of said performance tradeoff equalities is defined such that the frequency response of said equalizer to be optimized is first constrained to be real or nonnegative in step b and step c, at each of said selected frequencies.

3. The method of claim 1, wherein each of said performance tradeoff equalities relates to a vector norm of the magnitudes of the frequency responses of a system at each of said selected frequencies, said system is related to said input-output channels.

4. The method of claim 1, wherein each of said performance tradeoff equalities relates to a curve or hyper-dimensional surface defined for the magnitudes of the frequency responses of said input-output channels at each of said selected frequencies with intension to approximate a hyper-dimensional rectangle, said hyper-dimensional rectangle is derived from a performance measure of each of said input-output channels for model-matching.

5. The method of claim 1, wherein said phases are generated by signal processing techniques related to complex cepstrum, incorporating said magnitudes.

6. The method of claim 1, wherein said equalizer coefficients for implementation are derived from the inverse discrete Fourier transform of said magnitudes and said phases of said frequency response of said equalizer at said set of selected frequencies.

7. The method of claim 1, wherein said equalizer coefficients for implementation are derived from curve-fitting said magnitudes and said phases of said frequency response of said equalizer at said set of selected frequencies.

8. A method for designing a frequency-shaping equalizer to compensate for the frequency response of an existing system, said method comprising:

a. providing a performance block diagram defining one or a plurality of input-output channels for performance tradeoff, said performance block diagram comprising a plurality of blocks representing the dynamics of said equalizer to be designed, the dynamics of said existing system, and the dynamics of one or a plurality of selected performance weighting filters;

b. defining a set of performance tradeoff optimization problems relating to the frequency response of said input-output channels, at a set of selected frequencies, each of said tradeoff optimization problems being defined at each of said set of selected frequencies;

c. computing the magnitudes of the frequency response of said equalizer at said set of selected frequencies, by solving each of said tradeoff optimization problems independently;

d. generating the phases of said equalizer at said set of selected frequencies from said magnitudes, said phases and said magnitudes corresponding to the frequency response of a stable system at said set of selected frequencies;

e. providing a set of equalizer coefficients for implementation, said equalizer coefficients being derived from said magnitudes and said phases of said frequency response of said equalizer at said set of selected frequencies.

9. The method of claim 8, wherein each of said performance tradeoff optimization problems is defined such that the frequency response of said equalizer to be optimized is first constrained to be real or nonnegative in step b and step c, at each of said selected frequencies.

10. The method of claim 8, wherein said phases are generated by signal processing techniques related to complex cepstrum, incorporating said magnitudes.

11. The method of claim 8, wherein said equalizer coefficients for implementation are derived from the inverse discrete Fourier transform of said magnitudes and said phases of said frequency response of said equalizer at said set of selected frequencies.

12. The method of claim 8, wherein said equalizer coefficients for implementation are derived from curve-fitting said magnitudes and said phases of said frequency response of said equalizer at said set of selected frequencies.

* * * * *